(12) United States Patent
Nihalani et al.

(10) Patent No.: US 10,198,764 B2
(45) Date of Patent: *Feb. 5, 2019

(54) SYSTEM AND METHOD FOR MESSAGE-BASED PURCHASING

(71) Applicant: Amazon Technologies, Inc., Reno, NV (US)

(72) Inventors: Vishay S. Nihalani, Berkeley, CA (US); Diwakar Gupta, Seattle, WA (US); Chih-Jen Huang, Kirkland, WA (US); Philip Yuen, Bellevue, WA (US); Howard B. Gefen, Kirkland, WA (US); Gerald Yuen, Pasadena, CA (US)

(73) Assignee: Amazon Technologies, Inc., Reno, NV (US)

( * ) Notice: Subject to any disclaimer, the term of this patent is extended or adjusted under 35 U.S.C. 154(b) by 1070 days.

This patent is subject to a terminal disclaimer.

(21) Appl. No.: 14/020,700

(22) Filed: Sep. 6, 2013

(65) Prior Publication Data

US 2014/0012702 A1    Jan. 9, 2014

Related U.S. Application Data

(63) Continuation of application No. 13/569,007, filed on Aug. 7, 2012, now Pat. No. 8,533,059, which is a
(Continued)

(51) Int. Cl.
*G06Q 30/00* (2012.01)
*G06Q 30/06* (2012.01)
*G06Q 30/02* (2012.01)

(52) U.S. Cl.
CPC ......... *G06Q 30/0633* (2013.01); *G06Q 30/02* (2013.01); *G06Q 30/0601* (2013.01)

(58) Field of Classification Search
CPC . G06Q 30/00; G06Q 30/0601; G06Q 30/0633
(Continued)

(56) References Cited

U.S. PATENT DOCUMENTS 5,179,721 A    1/1993  Comroe et al.
5,475,756 A    12/1995 Merritt
(Continued)

FOREIGN PATENT DOCUMENTS

CN    1845599      10/2006
CN    101101656    1/2008
(Continued)

OTHER PUBLICATIONS

Linderman, Teresa: "Services help shoppers with cell phones find merchandise," Knight Rider Tribune Business News; May 20, 2007; Proquest 3pgs.*
(Continued)

*Primary Examiner* — Robert M Pond
(74) *Attorney, Agent, or Firm* — Robert C. Kowert; Meyertons, Hood, Kivlin, Kowert & Goetzel, P.C.

(57) ABSTRACT

Various embodiments of a system and method for message-based purchasing are described. The system and method for message-based purchasing may include a message-based purchase service configured to determine that a selection has been performed through a network-based interface. Such selection may be indicative of one or more items offered for sale via the network-based interface. The message-based purchase service may be configured to, in response to the selection of one or more items, send to a communication device, a message indicating a code corresponding to the selection. The message-based purchase service may receive from the communication device through a communication channel that does not include the network-based interface, a message including the code. The message-based purchase service
(Continued)

service may be configured to, in response to determining that the message received from the communication device includes the code, generate a purchase request for the one or more previously selected items.

20 Claims, 7 Drawing Sheets

Related U.S. Application Data continuation of application No. 12/057,148, filed on Mar. 27, 2008, now Pat. No. 8,244,592.

(58) Field of Classification Search
USPC .................................................... 705/26, 27
See application file for complete search history.

(56) References Cited

U.S. PATENT DOCUMENTS

| | | | |
|---|---|---|---|
| 5,613,012 A | 3/1997 | Hoffman et al. | |
| 5,802,499 A | 9/1998 | Sampson et al. | |
| 5,937,396 A | 8/1999 | Konya | |
| 5,949,044 A | 9/1999 | Walker et al. | |
| 5,956,700 A | 9/1999 | Landry | |
| 6,085,194 A | 7/2000 | Ige et al. | |
| 6,394,907 B1 | 5/2002 | Rowe | |
| 6,430,407 B1 | 8/2002 | Turtiainen | |
| 6,601,057 B1 | 7/2003 | Underwood et al. | |
| 6,609,113 B1 | 8/2003 | O'Leary et al. | |
| 6,816,724 B1 | 11/2004 | Asikainen | |
| 7,031,733 B2 | 4/2006 | Alminana et al. | |
| 7,076,329 B1 | 7/2006 | Kolls | |
| 7,089,208 B1 | 8/2006 | Levchin et al. | |
| 7,127,264 B2 | 10/2006 | Hronek et al. | |
| 7,139,694 B2 | 11/2006 | Horn et al. | |
| 7,240,832 B2 | 7/2007 | Bendeck et al. | |
| 7,245,902 B2 | 7/2007 | Hawkes | |
| 7,245,905 B2 | 7/2007 | Hawkes | |
| 7,251,495 B2 | 7/2007 | Keyani et al. | |
| 7,636,695 B2 | 12/2009 | Driessen | |
| 7,693,797 B2 | 4/2010 | Ekberg | |
| 7,716,199 B2 | 5/2010 | Guha | |
| 7,729,989 B1 | 6/2010 | Yuen | |
| 7,904,799 B1 | 3/2011 | Underwood et al. | |
| 8,204,827 B1 | 6/2012 | Gupta | |
| 2001/0037254 A1* | 11/2001 | Glikman ............... | G06Q 20/12 705/26.41 |
| 2001/0037264 A1 | 11/2001 | Husemann et al. | |
| 2002/0046353 A1 | 4/2002 | Kishimoto | |
| 2002/0049644 A1 | 4/2002 | Kargman | |
| 2002/0123940 A1 | 9/2002 | Spets | |
| 2002/0156746 A1 | 10/2002 | Horn et al. | |
| 2002/0198849 A1 | 12/2002 | Piikivi | |
| 2003/0033522 A1 | 2/2003 | Bilgic et al. | |
| 2003/0065615 A1 | 4/2003 | Aschir | |
| 2003/0071859 A1 | 4/2003 | Takami et al. | |
| 2003/0091170 A1 | 5/2003 | McCann et al. | |
| 2003/0105707 A1 | 6/2003 | Audebert et al. | |
| 2003/0110114 A1 | 6/2003 | Dmochowski | |
| 2003/0123669 A1 | 7/2003 | Koukoulidis et al. | |
| 2003/0126076 A1 | 7/2003 | Kwok et al. | |
| 2003/0139174 A1 | 7/2003 | Rao | |
| 2003/0144952 A1 | 7/2003 | Brown et al. | |
| 2003/0166396 A1 | 9/2003 | Vermelle et al. | |
| 2003/0171993 A1 | 9/2003 | Chappuis | |
| 2003/0212601 A1 | 11/2003 | Silva et al. | |
| 2004/0006538 A1 | 1/2004 | Steinberg et al. | |
| 2004/0019564 A1 | 1/2004 | Goldthwaite et al. | |
| 2004/0029569 A1 | 2/2004 | Khan et al. | |
| 2004/0030601 A1 | 2/2004 | Pond et al. | |
| 2004/0078340 A1 | 4/2004 | Evans | |
| 2004/0081110 A1 | 4/2004 | Koskimies | |
| 2004/0205026 A1 | 10/2004 | Shah et al. | |
| 2004/0214597 A1 | 10/2004 | Suryanarayana et al. | |
| 2005/0044410 A1 | 2/2005 | Yan | |
| 2005/0060250 A1 | 3/2005 | Heller et al. | |
| 2005/0102230 A1 | 5/2005 | Haidar | |
| 2005/0113066 A1 | 5/2005 | Hamberg | |
| 2005/0120249 A1 | 6/2005 | Shuster | |
| 2005/0144020 A1 | 6/2005 | Muzaffar et al. | |
| 2005/0192893 A1 | 9/2005 | Keeling et al. | |
| 2005/0220134 A1 | 10/2005 | Lin | |
| 2005/0238149 A1 | 10/2005 | De Leon | |
| 2005/0256781 A1 | 11/2005 | Sands et al. | |
| 2006/0080232 A1 | 4/2006 | Epps | |
| 2006/0131390 A1 | 6/2006 | Kim | |
| 2006/0149644 A1 | 7/2006 | Sulmar et al. | |
| 2006/0206709 A1 | 9/2006 | Labrou et al. | |
| 2006/0253339 A1 | 11/2006 | Singh et al. | |
| 2006/0253392 A1 | 11/2006 | Davies | |
| 2007/0022019 A1 | 1/2007 | Sherwin et al. | |
| 2007/0027775 A1 | 2/2007 | Hwang | |
| 2007/0047719 A1 | 3/2007 | Dhawan et al. | |
| 2007/0049303 A1 | 3/2007 | Lee | |
| 2007/0054678 A1 | 3/2007 | Doulton | |
| 2007/0067398 A1 | 3/2007 | Karmarkar | |
| 2007/0094135 A1 | 4/2007 | Moore et al. | |
| 2007/0094150 A1 | 4/2007 | Yuen et al. | |
| 2007/0100651 A1 | 5/2007 | Ramer et al. | |
| 2007/0106564 A1 | 5/2007 | Matotek et al. | |
| 2007/0107044 A1 | 5/2007 | Yuen et al. | |
| 2007/0213991 A1 | 9/2007 | Bramante | |
| 2007/0233615 A1 | 10/2007 | Tumminaro | |
| 2007/0255620 A1 | 11/2007 | Tumminaro et al. | |
| 2007/0255652 A1 | 11/2007 | Tumminaro et al. | |
| 2007/0255653 A1 | 11/2007 | Tumminaro et al. | |
| 2007/0255662 A1 | 11/2007 | Tumminaro | |
| 2007/0257108 A1 | 11/2007 | Bellino et al. | |
| 2007/0282756 A1 | 12/2007 | Dravenstott et al. | |
| 2008/0003977 A1 | 1/2008 | Chakiris et al. | |
| 2008/0006685 A1 | 1/2008 | Rackley, III et al. | |
| 2008/0010190 A1 | 1/2008 | Rackley, III et al. | |
| 2008/0010191 A1 | 1/2008 | Rackley, III et al. | |
| 2008/0010192 A1 | 1/2008 | Rackley, III et al. | |
| 2008/0010193 A1 | 1/2008 | Rackley, III et al. | |
| 2008/0010196 A1 | 1/2008 | Rackley, III et al. | |
| 2008/0010204 A1 | 1/2008 | Rackley, III et al. | |
| 2008/0010215 A1 | 1/2008 | Rackley, III et al. | |
| 2008/0017702 A1 | 1/2008 | Little et al. | |
| 2008/0027844 A1 | 1/2008 | Little et al. | |
| 2008/0040233 A1 | 2/2008 | Wildman et al. | |
| 2008/0052620 A1 | 2/2008 | Hwang | |
| 2008/0071633 A1 | 3/2008 | Ozkan et al. | |
| 2008/0109472 A1 | 5/2008 | Underwood et al. | |
| 2008/0147741 A1 | 6/2008 | Gonen et al. | |
| 2008/0177661 A1 | 7/2008 | Mehra | |
| 2008/0181198 A1 | 7/2008 | Yasrebi et al. | |
| 2008/0270251 A1 | 10/2008 | Coelho et al. | |
| 2008/0275786 A1* | 11/2008 | Gluck .................... | G06Q 30/02 705/14.35 |
| 2008/0291899 A1 | 11/2008 | Gromoll et al. | |
| 2009/0106138 A1 | 4/2009 | Smith et al. | |
| 2009/0249459 A1 | 10/2009 | Coughlin et al. | |
| 2009/0287601 A1 | 11/2009 | Tumminaro et al. | |
| 2010/0016002 A1 | 1/2010 | Konicek et al. | |
| 2010/0041366 A1 | 2/2010 | Zackrisson | |
| 2010/0076853 A1* | 3/2010 | Schwarz ................ | G06Q 20/12 705/15 |
| 2010/0130164 A1 | 5/2010 | Chowdhury et al. | |

FOREIGN PATENT DOCUMENTS

| | | |
|---|---|---|
| EP | 0668580 | 8/1995 |
| GB | 2397731 | 7/2004 |
| JP | 2002-207934 | 7/2002 |
| JP | 2003085468 A | 3/2003 |
| JP | 2004362470 A | 12/2004 |
| JP | 2005157722 A | 6/2005 |
| KR | 10-2002-0015760 | 8/2000 |
| KR | 2002-0045082 | 6/2002 |
| KR | 2005-0007986 | 1/2005 |
| KR | 2005-0120890 | 12/2005 |
| KR | 2005-0122935 | 12/2005 |

(56) References Cited

FOREIGN PATENT DOCUMENTS

| KR | 20060012250 | 2/2006 |
|---|---|---|
| KR | 2006-0106328 | 10/2006 |
| KR | 2006-0114776 | 11/2006 |
| WO | 01/17310 | 3/2001 |
| WO | 2003-005270 | 7/2002 |
| WO | 2005050911 | 6/2005 |

OTHER PUBLICATIONS

"Citi Launches Two Trials of Mobile P-to-P Technology," American Banker Aug. 6, 2007, v172i150, ProQuest Dialog #167244872, 4pgs.*
Wolfe, Daniel: "PayPal Service for Mobile Devices," American Banker [New York, N.Y] Jul. 13, 2007; ProQuest # 249898041, 3pgs.*
"Companies envision mobile way to pay-cell phones are at the core of new services," Mylene Mangalindan and Jessica E. Vascellaro; The Wall Street Journal. South Florida Sun—Sentinel [Fort Lauderdale, Fla] Apr. 30, 2006: 4E, ProQuest # 389786821 5pgs.*
"Services help shoppers with cell phones find merchandise" (Teresa F. Linddeman. Knight Rider Tribune Business News. Washington: May 20, 2007) p. 1.
Office Action from Japanese Patent Application No. 2011-501890, dated May 21, 2013, pp. 1-4.
Layton, J., "How ebay Works," How Stuff Works website. Dec. 3, 2005, p. 1.
Foreign Search Report from PCT/US2009/03684 7 dated Oct. 19, 2009.
"You've Got Money: Paying via Text Message," [online]. The Wall Street Journal Online, Apr. 26, 2006, retrieved from the Internet: fURL's: http://online.wsj.com/article_prinUSB 114600991211335921. html [retrieved on Feb. 8, 2007]. pp. 1-4.
"Mobile Payment—Product and Service Description", downloaded from http://www.mobileweb.be/en/sms-payment.asp on Oct. 24, 2007, pp. 1-3.
"Anam introduces SMS payments", downloaded from http://www.theregister.co.uk/2007/06/hash_cash_sms payments/print.html on Oct. 24, 2007, pp. 1-2.
"Make mobile content delivery and billing cost effective, simple and fast with mSERVI", downloaded from http://mbill.biz/solutions/mserv/?gclid=CMHBhMasqi8DFRUHWAod62K8Sg on Oct. 24, 2007, pp. 1-2.
"All about texting, SMS and MMS", downloaded from http://www.textually.org/textuallv/archives/cat_sms_and_micro_payments.htm on Oct. 24, 2007, pp. 1-10.
"PayPal to rival TextPayMe for SMS payments?", downloaded from http://www.engadget.com/2006/02/03/paypal-torival-textpayme-for-sms-payments on Oct. 24, 2007, pp. 1-11.
PayPal to launch SMS payments service, downloaded from http://www.finextra.com/fullstory.asp?id=15091 on Oct. 24, 2007, pp. 1-2.
"US Catches on with SMS Payments", downloaded from http://yugatech.com/blog/the-interneUus-catches-on-withsms-payments on Dec. 24, 2007, pp. 1-8.
"SMS Payment", downloaded from http://www.moldcell.md/eng. Services/Payments./SMSpayment on Oct. 24, 2007, pp. 1-2.
"Welcome to Sepomo Micropayments", downloaded from http://www.sepomo.com/en/welcom.php on Oct. 24, 2007, pp. 1-4.
"Secure SMS Payment Solutions", downloaded from http:/www,eko.com.au/?Solutions/Payment on Oct. 24, 2007, pp. 1-2.
"Why is SMS Marketing more effective than traditional methods?", downloaded from http://www.market-to-cell.com/?ppc_id=105432 &type=GoopleAdwordsSearch&ppc_kw on Oct. 24, 2007, pp. 1-4.
"SMS/mobile micro payments—how to?", downloaded from http://quomon.com/questions_SMS_mobile_micro_payments-to_I93.aspx on Oct. 24, 2007, pp. 1-3.
"Mobile Payment: A Journey Through Existing Procedures and Standardization Initiatives", by Kamouskos et al., for IEEE Communications Surveys, The Electronic magazine of Original Peer-Reviewed Survey Articles, Fourth Quarter 2004, vol. 6, No. 4, pp. 44-66.
"What is TextPayMe?" [online], TextPayMe, 2005-2006, [retrieved on Nov. 6, 2006]. Retrieved from the Internet: <URL: www.textpayme.com/us/secure/index.tpm>, p. 1.
"PayPal Goes Mobile" [online]. PayPal, 1999-2006, [retrieved on Nov. 6, 2006]. Retrieved from the Internet: <URL's: www.paypal.com/cgi-bin/webscr?cmd=xpUcps/mobile/MobileOverview-outside;> pp. 1-14.
"SMS Payment" [online]. Moldcell, 2006, [retrieved on Nov. 6, 2006], Retrieved from the Internet: <URL: www.moldcell.md/eng/Services/Payments/SMSpayment>, pp. 1-2.
"Atlas Telecom Mobile launches an international text message based payment solution for Internet content" [online]. SMS Kambi, 2003, [retrieved on Nov. 6, 2006]. Retrieved from the Internet: URL:www.smskambi.com/en/press/2003-03-13.jsp, p. 1.
Atlas Telecom Mobile will offer its payment solution via mobile phone to Tadaa Wireless WiFi clientele [online]. SMS Kambi, 2003, [retrieved on Nov. 6, 2006]. Retrieved from the Internet: <URL: www.smskambi.com/en/press/2003-07-17. jsp>, p. 1.
"Frequently Asked Questions: Answers to all questions about SMS Kambi" [online]. SMS Kambi, 2003, [retrieved on Nov. 6, 2006]. Retrieved from the Internet: <URL: www.smskambi.com/en/faq.jsp>, pp. 1-5.
TextPayMe Tour [online]. TextPayMe, 2005-2006, [retrieved on Nov. 6, 2006]. Retrieved from the Internet: <URL'S: www.textpayme.com/us/tour/tour1.tpm; www.textpayme.com/us/tour/tour2.tpm; www.textpayme.com/us/tour/tour3.tpm; www.textpayme.com/us/tour/tour4.tpm; www.textpayme.com/us/secure/register.tpm>, pp. 1-6.
"Paypal to offer SMS payment" [online]. lol,2006, [retrieved on Nov. 6, 2006]. Retrieved from the Internet: <URL: www.iol.co.za/index.php?set_id=1&click_id=115&art_id=iol1143117211111 P140>, pp. 1-2.
"Mobilelime makes shopping more rewarding" [online]. Mobileline, 2006, [retrieved on Nov. 6, 2006]. Retrieved from the Internet: <URL: www.mobilelime.com/mobilelime/home.do?action=index; www.mobilelime.com/mobilelime/home.do?action=consumersl; www.mobilelime,com/mobilelime/home.do?action=earnrewards; www.mobilelime.com/mobilelime/home.do?action=makepurchases; www.mobilelime.com/mobilelime/home.do?action=doitall; www.mobilelime.com/mobilelime/home.do?action=whouses; www.mobilelime.com/mobilelimehome.do? pp. 1-10.
"Obopay" [online]. Obopay, 2006, [retrieved on Nov. 6, 2006]. Retrieved from the Internet: <URL: https://www.obopay.com/consumer/; www.obopay.eom/consumer/GetHelp.do;jsession id=F 1 ndf7KY s ThCHJ2HZ2HziCk4 72Y 1cL6mXbzGyZFyGJvIt2RDjblz!-468797365?target=Leam More Page; www.obopay.com/consumer/GetHelp.do?target=HelpTextMessagingPage; www.obopay.com/consumer/GetHelp.do?target=HelpHowWorks>, pp. 1-8.
"BillMonk" [online]. BiiiMonk, 2006, [retrieved on Nov. 6, 2006]. Retrieved from the Internet: <URL: www.billmonk.com/; www.billmonk.com/abouUfaq; www.billmonk.com/abouUsms; https://www.billmonk.com/images/screenshot_sms_shared_flow.png>, pp. 1-15.
U.S. Appl. No. 11/858,001, filed Sep. 19, 2007, Philip Yuen, et al.
U.S. Appl. No. 11/611,716, filed Dec. 15, 2006, Christopher L. Scofield.
U.S. Appl. No. 11/858,006, filed Sep. 19, 2007, Philip Yuen, et al.
"Services Help Shoppers with Cell Phones Find Merchandise," (Teresa F. Linddeman, Knight Rider Tribune Businnes News. Washington, May 20, 2007, p. 1 ). Retrieved from Proquest Apr. 4, 2012. pp. 1-3.
KIPO's Notice of Preliminary Rejection from Korean Patent Application No. 10-2010-7024174, dated Jan. 19, 2016 (English Translation and Korean Version), pp. 1-9.
First Office Action from Chinese Application No. 201410437930.3, dated Mar. 21, 2017 (English translation and Chinese version), Amazon Technologies, Inc., pp. 1-21.
First Examination Report from Indian REf. No. POD/Application No. /7415/DELNP/2010, dated May 31, 2017, Amazon Technologies, Inc., pp. 1-6.

(56) References Cited

OTHER PUBLICATIONS

Office Action from Chinese Application No. 201410437930.3, dated May 14, 2018 (Chinese version & English Translation), Amazon Technologies, Inc., pp. 1-10.

\* cited by examiner

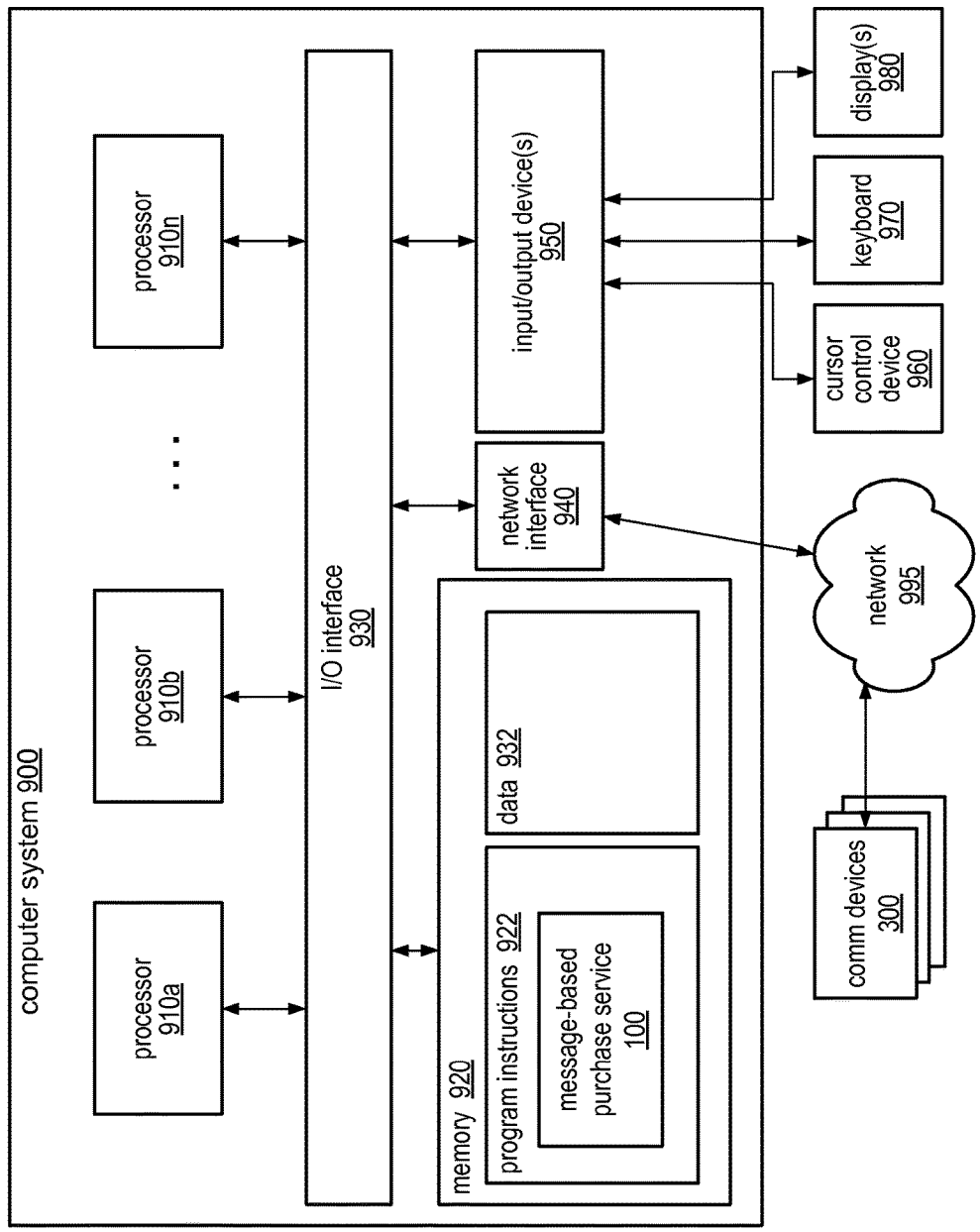

SYSTEM AND METHOD FOR MESSAGE-BASED PURCHASING

This application is a continuation of U.S. patent application Ser. No. 13/569,007, filed Aug. 7, 2012, which is a continuation of U.S. patent application Ser. No. 12/057,148, filed Mar. 27, 2008, now U.S. Pat. No. 8,244,592, which are hereby incorporated be reference in their entirety.

BACKGROUND

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

Web Services

Generally speaking, a web service interface may be configured to provide a standard, cross-platform API (Application Programming Interface) for communication between a client requesting some service to be performed and the service provider. In some embodiments, a web service interface may be configured to support the exchange of documents or messages including information describing the service request and response to that request. Such documents, or messages, may be exchanged using standardized web protocols, such as the Hypertext Transfer Protocol (HTTP), for example, and may be formatted in a platform-independent data format, such as eXtensible Markup Language (XML), for example.

Mobile Telephony And SMS

Mobile telephony has emerged alongside the Internet and the web, and the two technologies have crossed over and merged to form what is essentially a global communications and information network. Cellular telephones, for example, have become "digital", and continue to become more sophisticated. Today, many digital cell phones are capable of web access via their cellular service providers. Similarly, many web applications are capable of telephone communications to conventional phones and to mobile telephones. In addition, other technologies such as text messaging have emerged to enhance the capabilities and uses of mobile telephones and other personal electronic devices. Further, other personal electronic devices, such as Personal Digital Assistants (PDAs) may provide mobile telephone links to the web, and user interfaces for accessing the web, along with text messaging and other information and communications capabilities. Thus, these devices are part of the emerging global communications and information network. SMS (Short Message Service) is an exemplary service for sending messages of up to 160 characters (224 characters if using a 5-bit mode) to mobile phones. SMS does not require the mobile phone to be active and within range. An SMS message may be held until the target phone is active and within range. SMS messages may be transmitted within the same cell, or out of the cell to phones with roaming service capability. SMS messages may also be sent to digital phones from a web site, or from one digital phone to another. An SMS gateway is a web site that accepts SMS messages for transmission to cell phones within the cell served by that gateway, or that acts as an international gateway for users with roaming capability.

Various applications of the Internet, and of the web, involve marketplaces that provide goods and services for sale. For instance, consumers may visit a merchant's website to view goods and services offered for sale. With the merging of mobile telephony and other technologies and the web into an emerging global communications and information network, these other technologies have become part of such marketplaces in many such applications.

BRIEF DESCRIPTION OF THE DRAWINGS

FIG. 9 illustrates a computer system suitable for implementing a message-based purchase service, according to one embodiment.

Figure 1:
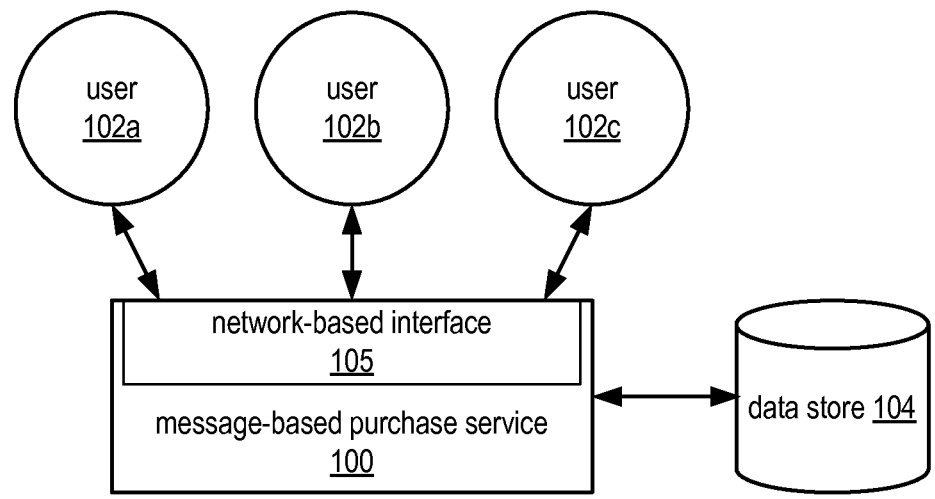
FIG. 1 illustrates a block diagram of a message-based purchase service according to one embodiment.

While the system and method for message-based purchasing is described herein by way of example for several embodiments and illustrative drawings, those skilled in the art will recognize that the system and method for message-based purchasing is not limited to the embodiments or drawings described. It should be understood, that the drawings and detailed description thereto are not intended to limit the system and method for message-based purchasing to the particular form disclosed, but on the contrary, the intention is to cover all modifications, equivalents and alternatives falling within the spirit and scope of the system and method for message-based purchasing as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for message-based purchasing are described. The system and method for message-based purchasing may include a message-based purchase service configured to determine that a selection has been performed through a network-based interface. Such selection may be indicative of one or more items offered for sale via the network-based interface. For instance, in one embodiment, a network-based interface may provide one or more sales listing (e.g., in the form of web pages) that may include user-interface controls for selecting one or more items. The message-based purchase service may be configured to, in response to the selection of one or more items, send to a communication device, a message indicating a code corresponding to the selection. For instance, in one embodiment, the message-based purchase service may send a text message that includes a particular code to a user's cell phone. In many cases, the communication device is a mobile device, thus enabling a user to access the message including the code from a variety of locations. In some cases, the user may bring their communication device to a retail store to view or operate one or more of the items selected via the network-based interface. For instance, the user may have selected a television via the network-based interface but would like to view the television in operation before committing to a purchase. In various embodiments, the user may commit to a purchase by sending a message including the code previously received to the message-based purchase service described herein. Accordingly, the message-based purchase service may also be configured to receive from the communication device through a communication channel that does not include the network-based interface, a message including the code. For instance, following the example above, a user may in one embodiment send a text message including the code to the message-based purchase service. The message-based purchase service may be configured to, in response to determining that the message received from the communication device includes the code, generate a purchase request for the one or more previously selected items.

The message-based purchase service described herein may in various embodiments support communications via various communication channels. Communication channels may include any methods or mechanisms for transmitting information between entities. Communication channels generally include protocols for information transfer (e.g., Short Message Service (SMS) for text messaging), media over or through which information is transmitted according to the protocols, and infrastructures for supporting the transmissions (e.g., cellular telephone service providers). Further, a communication channel may require various devices that enable entities to communicate via the communication channel, for example a mobile phone, satellite phone, cell phone, conventional telephone, computer system, or Personal Digital Assistant (PDA). Examples of communication channels include, but are not limited to, conventional, land-based telephone systems, mobile or cellular telephone systems, satellite telephone systems, email, instant messaging (IM), Voice over IP (VoIP), and text messaging. Note that separate communication channels may share one or more of protocol, media, infrastructure, and enabling device. For example, text messaging and cellular telephone systems may be enabled through the same device (a cell phone) and may transmit over the same medium.

Note that communications on communication channels over which voice messages may be transmitted (e.g., conventional, land-based telephone systems, mobile or cellular telephone systems, satellite telephone systems, VoIP, etc.) may collectively be referred to herein as "voice communications", and likewise the channels may be referred to collectively as "voice communication channels". Further note that voice communications includes both "live" or real human voice communications and automated voice systems. Automated voice systems include automated systems in which synthesized or recorded voice messages are transmitted to communicate information. Note that some automated voice systems may transmit at least some synthesized or recorded voice messages in response to vocal input (via voice recognition technology) or other input into a communication device (e.g., numeric key pad entries).

In some embodiments, a communication channel may include a network-based interface configured to support communications between a network-based entity (e.g., an online service or a web server supporting such service) and one or more other entities (e.g., users accessing such a service via the Internet or another network). One example of a network-based interface includes network-based interface 105 described in more detail in regard to FIG. 1 below. In various embodiments, a network-based interface may be a web-based interface configured for communications via the Internet or World Wide Web. For instance, in one embodiment, such a network-based interface may be configured to provide a user with one or more web pages for browsing or purchasing items. For example, if a network-based interface were implemented as part of an online merchant's website, the network-based interface may provide one or more product web pages enabling users to purchase one or more items via the Internet. In many embodiments, access to such a network-based interface may include the use of a personal computer equipped with a web browser, such as Internet Explorer, Mozilla Firefox, or Opera. In various embodiments, the e-commerce portal described herein may present its functionality to various users (e.g., users 102 described below) via such a network-based interface.

FIG. 1 illustrates one embodiment of a message-based purchase service that may be configured to generate a purchase request for one or more previously selected items based on a message received from a communication device, as described in more detail below. In the illustrated embodiment, a number of users 102a-c are shown as directly interacting with a message-based purchase service 100. Message-based purchase service 100 may be configured to interact with a data store 104. Users 102a-c may be collectively referred to as users 102, and a generic one of users 102a-c may simply be referred to as a user 102. While three users 102 are shown in FIG. 1, in various embodiments, any suitable number of users may be served by message-based purchase service 100.

In various embodiments, message-based purchase service 100 may be implemented via a host computer system, such as the system described below with respect to FIG. 9. In one embodiment, message-based purchase service 100 may be implemented as a web host or server configured to interact with users 102 via web-based protocols. For example, message-based purchase service 100 may be configured to present web pages or other content to users 102 in response to HTTP requests originating from web browsers operated by users 102. Such content, and/or other information about users 102 such as described below, may be stored by data store 104. In various embodiments, data store 104 may be configured as a database, as one or more mass storage devices (e.g., physical disks, logical volumes, etc.) configured to store data blocks or files, or in any other suitable configuration for data storage.

In some embodiments, message-based purchase service 100 may be configured to present its functionality via a web services interface. For example, message-based purchase service 100 may implement a web services endpoint (e.g., as indicated by a particular uniform resource indicator (URI)) through which clients, such as applications executing on behalf of users 102, may submit requests for services to be performed by message-based purchase service 100. In an implementation of message-based purchase service 100 conforming to a Representational State Transfer (REST)-style web services architecture, clients of message-based purchase service 100 may interface with message-based purchase service 100 to request web services by appending various parameters to an HTTP request directed to the URI corresponding to message-based purchase service 100. Alternatively, message-based purchase service 100 may implement a document- or message-oriented web services architecture. For example, a client may format a web services request as an eXtensible Markup Language (XML) document, encapsulating such a document using a version of the Simple Object Access Protocol (SOAP), and conveying the resulting encapsulated document to message-based purchase service 100 via HTTP or another suitable protocol. Collectively, the presentation of a web services interface and/or an interactive web-page-based, browser-accessible interface by message-based purchase service 100 may be generically referred to as a network-based interface. This functionality may be provided by network-based interface 105 of FIGS. 1 and 2.

It is also contemplated that in some embodiments, message-based purchase service 100 may interact with users 102 using protocols other than web services-related protocols. For example, such communication may take place using protocols such as Telnet, Remote Procedure Call (RPC), or other standard or proprietary protocols. Further, it is contemplated that in some embodiments, message-based purchase service 100 may be a dedicated system, while in other embodiments the functionality of message-based purchase service 100 may be integrated along with other, potentially unrelated functionality. In one such embodiment, message-based purchase service 100 may be implemented as a component of an e-commerce portal that may provide numerous other features to users 102 besides the features provided by message-based purchase service 100. For example, such an e-commerce portal may offer users 102 the opportunity to shop for and order merchandise, transact payments, offer their own merchandise to other users 102 and/or perform other commerce-related activities.

Generally speaking, users 102 may correspond to private individuals acting on their own behalf or acting as agents on behalf of other individuals or organizations with respect to their interactions with message-based purchase service 100. Users 102 may interact with message-based purchase service 100 through any suitable technique supported by message-based purchase service 100. For example, users 102 may access message-based purchase service 100 via a web browser or an application configured to implement a web services interface to message-based purchase service 100. In some embodiments, users 102 may also access message-based purchase service 100 via electronic mail (email), SMS messaging, or other suitable techniques. In some embodiments, each of users 102 may be associated with a respective unique identifier, such as a user ID or email address. In some such embodiments, message-based purchase service 100 or a broader system including message-based purchase service 100 may support additional credentialing features with which to authenticate users 102 prior to allowing users to interact with message-based purchase service 100. For example, message-based purchase service 100 may be implemented along with an e-commerce portal, the e-commerce portal may implement a user accounts feature through which users 102 are uniquely identified by a user ID/password combination. Upon supplying the appropriate credentials to the e-commerce portal, a given user 102 may be allowed to interact with features of message-based purchase service 100 and/or other features of the e-commerce portal.

Figure 2:
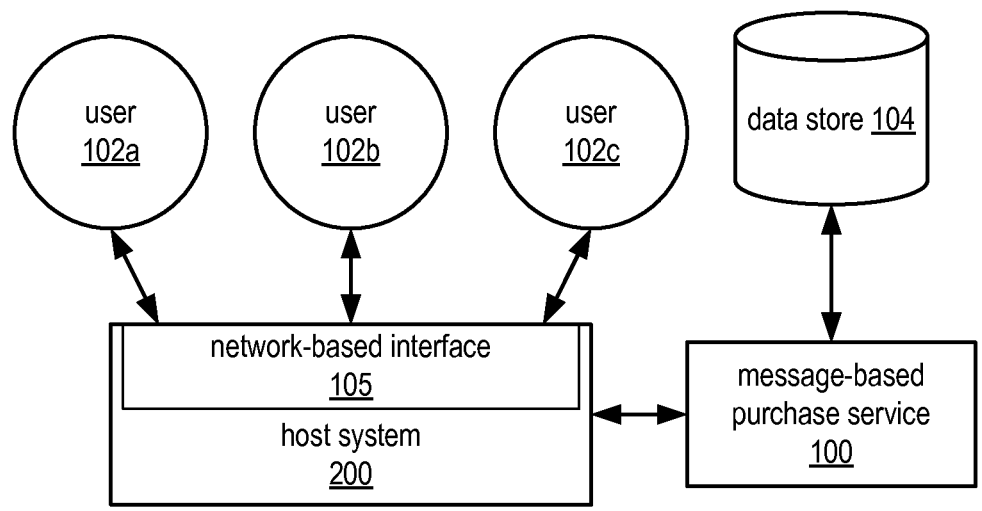
FIG. 2 illustrates a block diagram of a message-based purchase service according to one embodiment.

An alternative architecture employing message-based purchase service 100 is shown in FIG. 2. In the illustrated embodiment, users 102a-c do not interact directly with message-based purchase service 100, but rather with a host system 200, which in turn is configured to interact with message-based purchase service 100. Such an architecture may facilitate the deployment of the features of message-based purchase service 100 by a third party entity or enterprise for the benefit of its users. For example, host system 200 may be representative of the information technology (IT) infrastructure of an organization having a number of affiliated users (e.g., a business with employees, a university or school with students, etc.). Users 102 may use various features provided by the organization via host system 200, such as web-delivered content, email services, etc. An organization may elect to expose certain aspects of its infrastructure to message-based purchase service 100 in order to provide the features of message-based purchase service 100, without requiring users 102 to interact with message-based purchase service 100 directly. For example, the user interface presented by host system 200 may integrate features provided by message-based purchase service 100 as well as features provided by the organization. Host system 200 may integrate such features in a manner transparent to users 102, or may separately identify features provided by message-based purchase service 100 (e.g., via a co-branding arrangement).

In various embodiments, host system 200 may be a component of an e-commerce portal, such as a network-based server (e.g., a web server) configured to provide product sales listings (e.g., product web pages) to various ones of users 102. Such product sales listings may each include a description of an item (e.g., text, image, or multimedia descriptions). Such an ecommerce portal may enable users 102 to browse such product sales listings and select one or more items for purchase. In some cases, user 102 may desire to first view, inspect, or operate an item in person before committing to a purchase via the e-commerce portal. For example, if user 102 were interested in purchasing a television, user 102 may desire to view and/or operate a television of the same make and model before committing to purchasing the item. For instance, user 102 may travel to a retail store to view or operate a television of the same make and model in person. Additionally (or alternatively), user 102 may desire to compare a price at which the television is offered for sale by the e-commerce portal to a price at which a television of the same make and model is offered for sale by a competitor, such as a retail store. Accordingly, the message-based purchase service may enable a user to conveniently suspend a purchase (or potential purchase) of an item and (optionally) purchase the item at a later time (e.g., when the user is viewing or operating the item in a retail store), as described in more detail below.

In some embodiments (as is the case in the illustrated embodiment), network-based interface 105 may be a component of host system 200. Network-based interface 105 may be configured to provide users 102 with network-based content, such as various web pages. As described above, host system 200 may be a component of an e-commerce portal. Accordingly, network-based interface 105 may provide access to such e-commerce portal to various ones of users 102. For instance, network-based interface 105 may provide sales listings, such as product web pages, that enable users 102 to browse through descriptions of various items for sale. Such web pages may include various user accessible controls (buttons, text entry fields, and other user interface elements) for performing various actions, such as purchasing an item.

Figure 3:
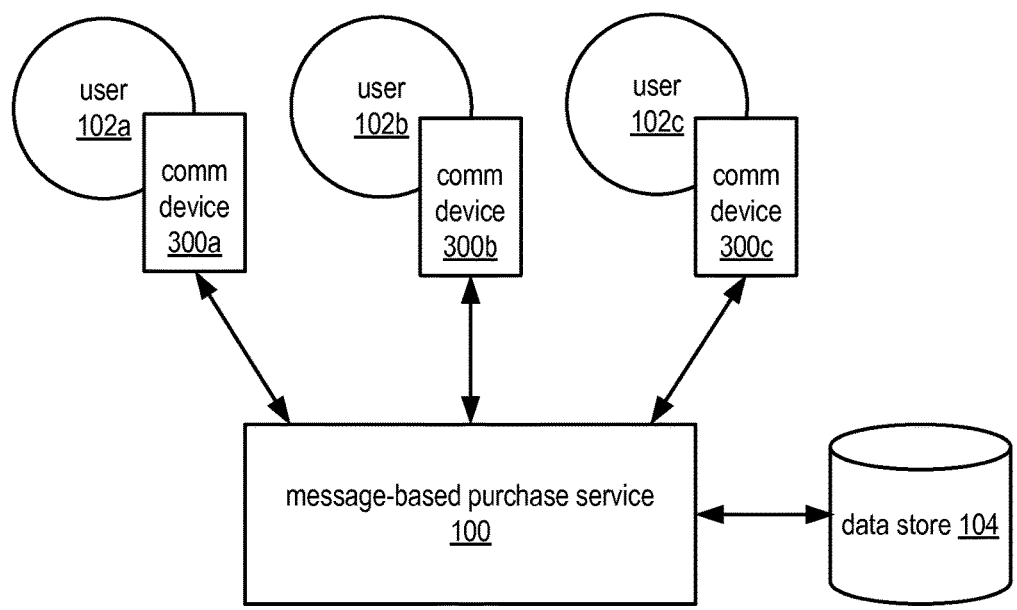
FIG. 3 illustrates a block diagram of a message-based purchase service according to one embodiment.

In various cases, users 102 and message-based purchase service 100 may communicate through communications channels that do not include a network-based interface (e.g., network based interface 105). One such case is demonstrated by FIG. 3, which illustrated users 102 communicating with message-based purchase service via various communication devices 300a-c (collectively referred to as communication devices 300). A generic one of communication device 300a-c may be referred to herein as communication device 300.

In various embodiments, communication device 300 may be a device configured to communicate with message-based purchase service 100 via a text messaging communication channel. For instance, the communication device 300 may be configured to transmit text messages to, receive text messages from, and/or exchange text messages with message-based purchase service 100. In various embodiments, such text messaging communications may adhere to one or more text messaging protocols including but not limited to SMS or other text messaging protocols, whether such other text messaging protocols are presently known or developed in the future.

In various embodiments, communication device 300 may be configured to communicate with message-based purchase service via a voice communication channel. Communication device 300 may be a cellular telephone, smart phone, personal digital assistant (PDA) or other device configured to communicate with the message-based purchase service via one or more cellular technologies including but not limited to Global System for Mobile Communications (GSM), General Packet Radio Service (GPRS), Code Division Multiple Access (CDMA), Time Division Multiple Access (TDMA), Evolution-Data Optimized (EV-DO), Enhanced Data Rates for GSM Evolution (EDGE), Universal Mobile Telecommunications System (UMTS), and/or other cellular technologies, whether such technologies are presently known or developed in the future.

In various embodiments, communication device 300 may be registered for access with message-based purchase service 100. For instance, message-based purchase service 100 may store one or more records of communication device 300 within data store 104. In some embodiments, such records may include a telephone number of communication device 300 or some other device identifier such as device 300's serial number or device 130's International Mobile Equipment Identity (IMEI) number.

Figure 4A:
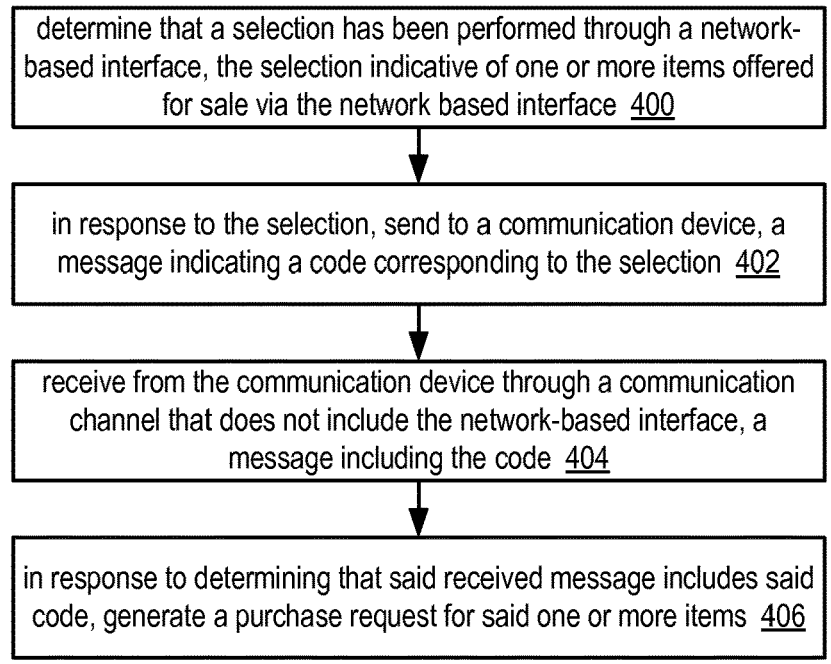
FIG. 4A illustrates a flowchart of an exemplary method that may be implemented by a message-based purchase service, according to one embodiment.

Various methods may be performed by message-based purchase service 100 described herein. One such method is illustrated by the flowchart of FIG. 4A. Operation of the method begins with determining that a selection has been performed through a network-based interface, the selection indicative of one or more items offered for sale via the network-based interface (block 400). In some embodiments, determining that a selection has been performed may include determining that user 102 has selected via network-based interface 105 one or more items offered for sale via network-based interface 105. For instance, as described above, host system 200 may be a component of an e-commerce portal and network-based interface 105 may provide access to such e-commerce portal to user 102. For example, network-based interface 105 may provide user 102 with one or more sales listings, such as product web pages. Such sales listings may include one or more controls for selecting one or more items. Determining that such a selection has been performed may include determining that one or more of such controls have been selected. One example of such controls is described below with respect to FIG. 5A.

Figure 5A:
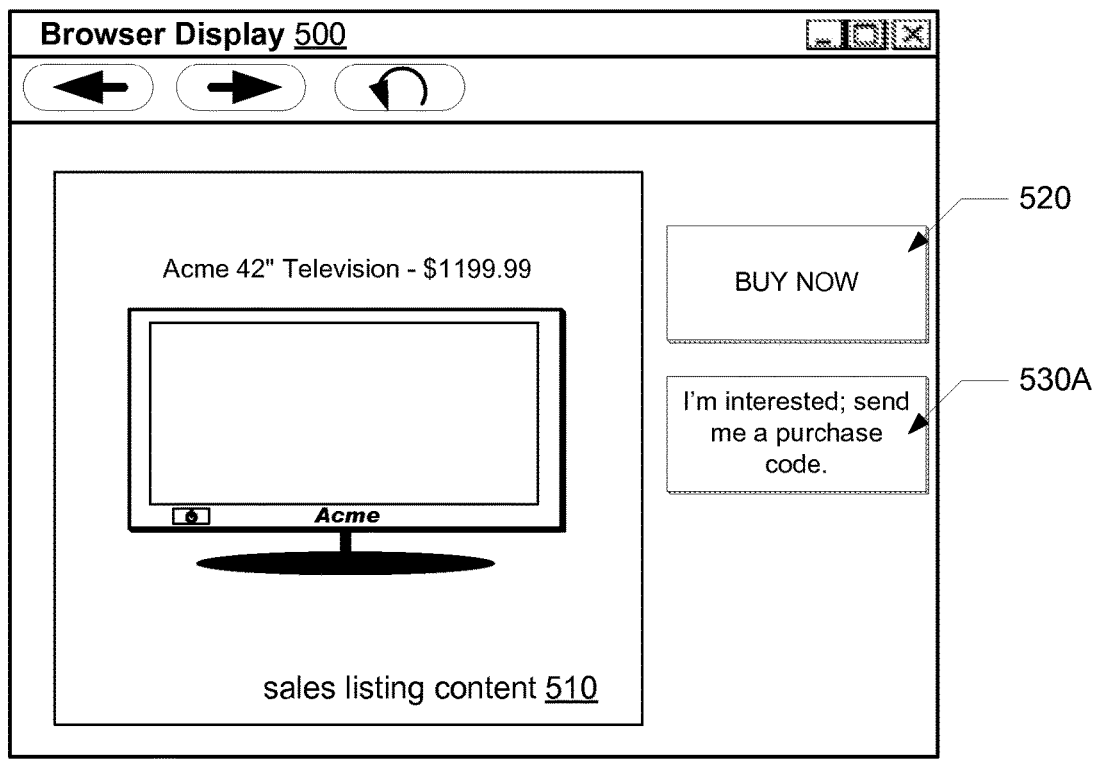
FIG. 5A illustrates one example of a display including a control for selecting an item for sale, according to one embodiment.

Referring momentarily to FIG. 5A, a browser display 500 is illustrated. Browser display 500 includes examples of content and controls that may be provided to users 102 by network-based interface 105. For instance, sales listing content 510 may include information about one or more items for sale such as images, multimedia and/or text based descriptions of the one or more items for sale. In the illustrated embodiment, the sales listing content corresponds to a television; however, sales listing content may in other cases correspond to any goods or services. In some cases, a user may choose to purchase the item described by selecting purchase control 520. However, as described above, there may be cases where user 102 is not yet prepared to purchase the item described by the sales listing content. For instance, the user may desire to view, inspect, and/or operate an item of the same type (e.g., same make and model) at a retail store in order to determine if he would like to purchase the item. In such cases, the user may indicate that he is interested in the item (but not yet ready to commit to purchasing the item) by selecting selection control 530A. Note that multiple displays may exist for multiple items for sale. Each display may have a control similar to selection control 530A; user 102 may select multiple items by selecting each item's respective selection control. Returning to FIG. 4A, determining that a selection has been performed through a network-based interface may include determining that a user has selected one or more of such selection controls. Note that in other embodiments, users may select an item via network-based interface 105 through other techniques, such as selecting items from a list, entering model numbers or item numbers of items, entering stock keeping unit (SKU) numbers, or indicating an item in some other manner. In general the method may include detecting any selection performed by a user via network-based interface 105.

In response to such selection performed through the network-based interface, the method may include sending to a communication device (e.g., communication device 300), a message indicating a code corresponding to the selection (block 402). Such code may be generated by message-based purchase service 100 and may include various characters, numbers, and/or symbols. For instance, examples of codes might include "buy," "item ABC123," "1G$3#df95" or some other code. The particular communication device to which the message is sent may be a communication device previously registered by the user with the message-based purchase service. One example of such a communication device includes communication device 300 described above. For example, message-based purchase service 100 may use the identity of the user that performed the selection of block 400 to determine which communication device should be sent the message indicating the code. For instance, message-based purchase service 100 may determine a device as specified by a customer account configuration file associated with the user. Such configuration file might specify information associated with the customers account such as device identifiers (e.g., phone numbers, etc.) and account preferences (e.g., shipping and/or billing preferences).

In various embodiments, sending the message indicating the code may include sending such message via a communications channel that does not include network-based interface 105. For instance, in some embodiments, message-based purchase service 100 may include utilizing a text-messaging communication channel by sending a text message including the code to the communication device. In some embodiments, such text message may adhere to a text messaging protocol such as the Short Message Service (SMS) protocol. In some embodiments, message-based purchase service 100 may send an email message to the communication device (e.g., if the communication device is configured for email access). In some embodiments, the communication device may be equipped with a dedicated client application for receiving messages from a message-based purchase service according to one or more communication protocols. In such cases, message-based purchase service 100 may be configured to send the message to the dedicated client according to such protocols.

Figure 6A:
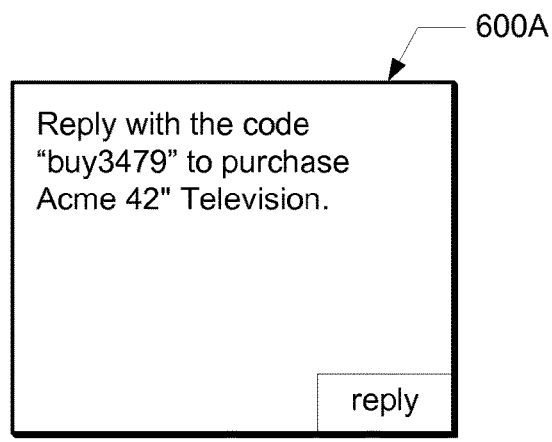
FIG. 6A illustrates one example of a message that may be sent by a message-based purchase service, according to one embodiment.

Referring momentarily to FIG. 6A, one example of such a message sent to the communication device by message-based purchase service 100 includes the illustrated message 600A. In some cases, message 600A may be a text message, such as a message adhering to the SMS protocol or some other text-messaging protocol. Note that the "code" of message 600A is represented as "buy3479." Note that in other embodiments such code might be delivered to the communication device via some other communication channel. For example, message-based purchase service 100 may utilize a voice communication channel to send the code to the communication device. For instance, message-based purchase service 100 may utilize an automated voice system to call the communication device and deliver the illustrated message via synthesized voice. In the illustrated embodiment, the message sent to the communication device corresponds to the television of FIG. 5A. However, in other cases, messages corresponding to other goods or services may be sent to the communication device.

By sending the message including the code to a communication device 300 associated with user 102, the message-based purchase service may enable the user to easily and conveniently purchase a selected item without accessing network-based interface 105 subsequent to the original selection of such item (e.g., as described in regard to block 400). For instance, user 102 may select one or more items via network-based interface 105 described above, such as items that user 102 is interested in purchasing (whether via a merchant controlling the network-based interface or another merchant, such as a retail store). By sending such message to communication device 300, which in many cases may be a mobile device (e.g., cell phone, PDA, smart phone, etc.), the message-based purchase service may enable the user to purchase an item from the merchant controlling the network-based interface without subsequent access to the network-based interface (e.g., access of the network-based interface subsequent to the selection of the one or more items).

Accordingly, the method of FIG. 4A may include receiving from the communication device through a communication channel that does not include the network-based interface, a message including the code (block 404). For instance, the method may include receiving a message sent by user 102 via communication device 300. For instance, the method may include message-based purchase service 100 receiving such message from communication device 300 via a text-messaging communication channel or a voice communication channel. In some embodiments, the received message may be a message sent as a reply to the message that the message-based purchase service sent to the communication device. For example, many text messaging clients include features (such as the "reply" control illustrated in FIG. 6A) that enable a user to reply to messages received by the communication device, such as messages stored in an inbox of the text messaging client. Such reply functionality may pre-populate portions of the reply message, such as a destination address. Utilizing such reply functionality may be convenient for user 102 when replying via a communication channel that is the same type of communication channel through which the received message was sent by the message-based purchase service. For instance, if message-based purchase service 100 sends a message including a code via a text messaging communication channel, it may be convenient for the user to reply via a text messaging communication channel. However, in some embodiments, the user may send a reply message via another communication channel, such as a voice communication channel. Accordingly, in some embodiments, the message-based purchase service may be configured to receive a reply message including the code via a communication channel that is different than the communication channel through which the message-based purchase service sent its message to the communication channel.

Figure 7:
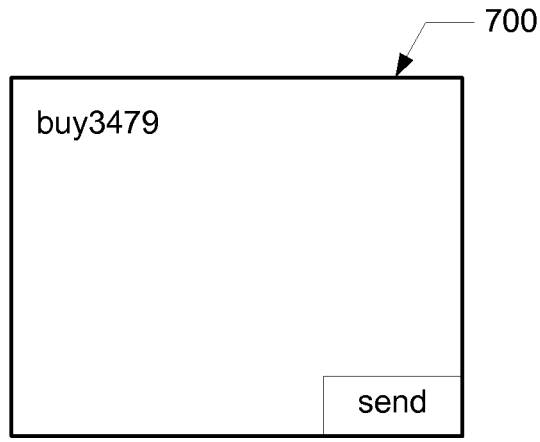
FIG. 7 illustrates one example of a message that may be received by a message-based purchase service, according to one embodiment.

Referring momentarily to FIG. 7, one example of a message 700 received by the message-based purchase service is illustrated. In the illustrated embodiment, message 700 is a message sent from communication device 300 in response to message 600A of FIG. 6A. As illustrated, message 700 includes the code (e.g., "buy3479") that was included in the message sent to the communication device by the message-based purchase service. For example, user 102 may have viewed and/or operated a model of the same type (e.g., same make and model) at a retail store and decided to purchase the item by sending the message include the code to the message-based purchase service. In this way, user 102 may utilize communication device 300 to purchase items when access to network-based interface is not available, such as when user 102 is located at a retail store. In other cases, the user may have access to network-based interface 105 but may prefer to purchase an item by sending a message include a code as described above.

Returning to FIG. 4A, the method may include, in response to determining that the received message includes the code, generating a purchase request for the one or more items. As described above, message-based purchase service may be implemented as a component of an e-commerce portal. Accordingly, in response to determining that the received message includes the code, the message-based purchase service may generate a purchase request for the e-commerce portal. The purchase request may specify information including but not limited to the customers identity (e.g., name or customer ID), the item(s) to be purchased (and associated quantities), the billing information for such purchase (e.g., payment method, credit card numbers, bank account and routing numbers, etc.) and shipping information for the such purchase (e.g., shipping method, shipping carrier, etc.). In some embodiments, the purchase request may be provided to and fulfilled by a commercial entity controlling the message-based purchase service. In other cases, the purchase request may be provided to and fulfilled by another commercial entity, such as a third party merchant.

In various embodiments, the method may include authorizing such purchase request. For instance, in one embodiment, message-based purchase service 100 may send an authorization request message to the communication device via a communication channel other than the communication channel through which the message-based purchase service received the message including the code from the communication device. For instance, if the user sent the message including the code from the communication device to the message-based purchase service via a text messaging communication channel, the message-based purchase service may contact user 102 with an authorization request message via a voice communication channel. For example, the message-based purchase service may contact the user with an automated voice system at a telephone number of the communication device; such telephone number may have been previously registered with the message-based purchase service or a commercial entity controlling the message-based purchase service. The authorization request message may prompt the user for validation information to verify the user's identity. For instance, such information may include a Personal Identification Number (PIN), a passcode, a pass phrase, a mother's maiden name, last four digits of Social Security number, or some other information for verifying the user's identity. If message-based purchase service receives a message including the requested validation information from the communication device via the same communication channel through which the validation information was requested, the message-based purchase service may indicate the purchase request as authorized. The message-based purchase service may provide such indication to another commercial entity, such as a third party merchant.

In some embodiments, the method may include generating mapping information indicating a correspondence between the code that is to be sent to the user and information for generating the purchase request. For instance, as described above with respect to block 402, the method may include the message-based purchase service sending a code to a communication device. Message-based purchase service may generate mapping information that indicates a correspondence between this code and one or more other elements including but not limited to an indication of the selected item(s) (e.g., one or more item identifiers or SKUs), shipping preferences (e.g., a shipping address, shipping carrier, shipping method) and billing preferences (payment method, credit card numbers, bank account and routing numbers, etc.). The message-based purchase service may in various embodiments generate a purchase request (e.g., block 406) based on this mapping information. For instance, a purchase request might indicate the items purchased, a credit card number of an account to be charged for the items, and that the items are to be shipped by ground.

In some embodiments, the method may include sending to the communication device a message indicating a promotional discount for the one or more selected items. For example, message-based purchase service 100 may determine that a message including the code has not been received from the communication device. For instance, the user of the communication device may no longer be interested in the selected item(s) or may have forgotten about the selected items. Accordingly, message-based purchase service 100 may send a promotional discount message to the communication device. For instance, such promotional discount message may entice the user of the communication device to purchase the item. Such enticement might include offering a lower than advertised price or a discount based on quantity of items purchased. The discount may also have a time-based expiration. For example, the promotional discount message might indicate "Reply with 'buy3479' within the next 5 minutes to receive 30% off the normal purchase price of Acme 42" Television."

In some embodiments, the method may include sending a reminder message to the communication device in order to remind the user about the selected item. For example, if the message-based purchase service has not received a message including the code from the communication device after a given time period, the message-based purchase service may conclude, for example, that the user of the communication device has forgotten about the selected items. Accordingly, message-based purchase service 100 may, in respond to determining that a given time period has elapsed, send a second message indicating the code corresponding to the selection performed via the network-based interface.

In various embodiments, the method may include sending a message indicating the code to the communication device in response to determining that the communication device is located within a given geographical region. For instance, the message-based purchase service may determine that the communication device is located in or around a retail store that carries one or more items selected by the user as described above with respect to block 400. In response to such determination, the message-based purchase service may send the communication device a message indicating the code. In some cases, this may be the message described above with respect to block 402; however, in other case such message may be a message sent subsequent to the message described above with respect to block 402. To determine the communication device's location, message-based purchase service 100 may be configured to determine the communication device's location through use of the Global Positioning System (GPS). In other embodiments, the message-based purchase service may be configured to determine the communication device's location through various alternative techniques including, but not limited to, the use of cellular telephone tower triangulation or alternatives to GPS, such as China's Beidou Navigation System or Russia's Global Navigation Satellite System. One skilled in the art will recognize that any of various methods may be employed to determine a communication device's location. It is the intention of various embodiments to include all such methods for determining a communication device's location, whether such methods are presently known or developed in the future.

As described above, the message-based purchase service may in some embodiments be a component of an e-commerce portal, such as an e-commerce portal that offers users 102 the opportunity to shop for and order merchandise, transact payments, offer their own merchandise to other users 102 and/or perform other commerce-related activities. For instance, such e-commerce portal may offer a variety of items for sale including the items selected by user 102 via the network-based interface. While user 102 selects such items, the e-commerce portal may offer the selected items for sale at a give price. Some time after the selection, such price may be modified by the e-commerce portal for various reasons including but not limited to issues related to supply and demand as well as changes in price offered by third party merchants or distributors. However, in some embodiments, the e-commerce portal may hold the price of the selected items constant for user 102 for a given time period. In other words, even when the e-commerce portal changes the price of the selected items, the user may purchase the selected items at the given price during such time period by sending the message including the code to the message-based purchase service via a communication channel that does not include the network-based interface. For instance, subsequent to a price modification of the selected items, the message-based purchase service may receive such message including the code (e.g., the code sent to the communication device as described above in regard to block 402) from the communication device and, subsequent to determining that the received message includes the code, process a sale of the selected items at the given price. In this way, the message-based purchase service may enable a user to "hold" an item at a particular price for a give time period without necessarily committing to purchasing the item. Note that after the given time period has expired, the e-commerce portal may in some embodiments prevent the sale of the selected items at the given price. If such prevention is implemented, the e-commerce portal may in some cases offer the selected items to user 102 at a different price.

In various embodiments, such an e-commerce portal may be configured to, in response to the selection describe above with respect to block 400, reserve one or more of the items selected for a given time period. For instance, to ensure that such selected items are in stock if/when a message including the code is received from communication device 300, the e-commerce portal may reserve such items for a given period of time. Reserving the selected items may include preventing the sale of such items to entities other than an entity controlling communication device 300 (e.g., user 102). In some embodiments, the message-based purchase service may be configured to render the code invalid after a given time period. In some cases, the e-commerce portal may release reserved items when such time period expires.

Figure 4B:
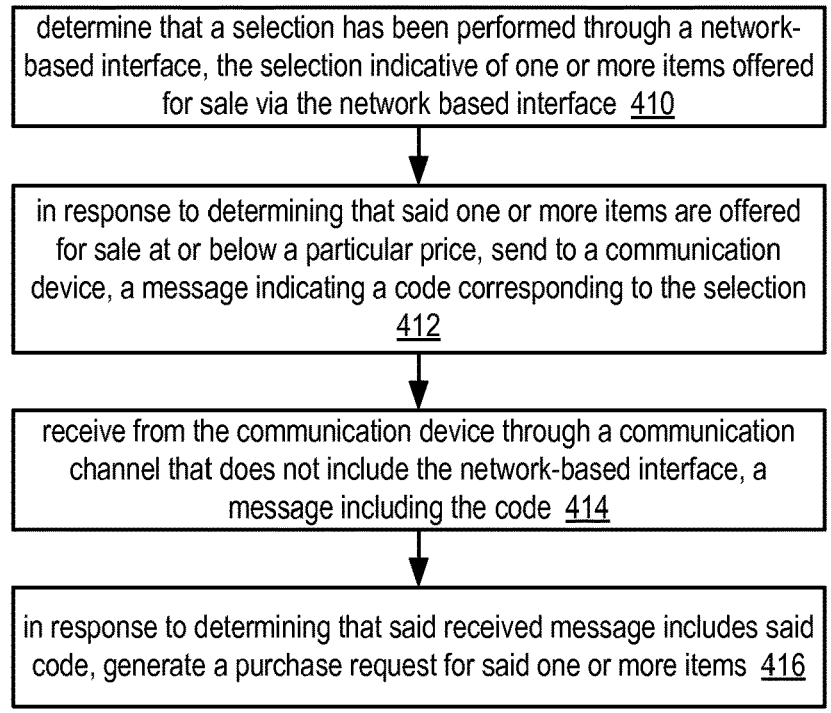
FIG. 4B illustrates a flowchart of another exemplary method that may be implemented by a message-based purchase service, according to one embodiment.

In various embodiments, the sending of the message including the purchase code to the communication device may be dependent on the price of the item(s) indicated by the selection. FIG. 4B includes a flowchart illustrating one example of such a method. The method may begin by determining that a selection has been performed through a network-based interface; such selection may be indicative of one or more items offered for sale via the network based interface (block 410). In some embodiments, determining that a selection has been performed may include determining that user 102 has selected via network-based interface 105 one or more items offered for sale via network-based interface 105. For instance, as described above, host system 200 may be a component of an e-commerce portal and network-based interface 105 may provide access to such e-commerce portal to user 102. For example, network-based interface 105 may provide user 102 with one or more sales listings, such as product web pages. Such sales listings may include one or more controls for selecting one or more items. Determining that such a selection has been performed may include determining that one or more of such controls have been selected. In some embodiments, such a selection may also be accompanied by a price threshold specified by a user. For instance, user 102 may specify that he desires to be notified when the selected item(s), e.g., drop below $100.00 or, e.g., drop 10% in price. The method may include detecting or determining such threshold specified by user 102. In other cases, such threshold may be specified by message-based purchase service 100.

Figure 5B:
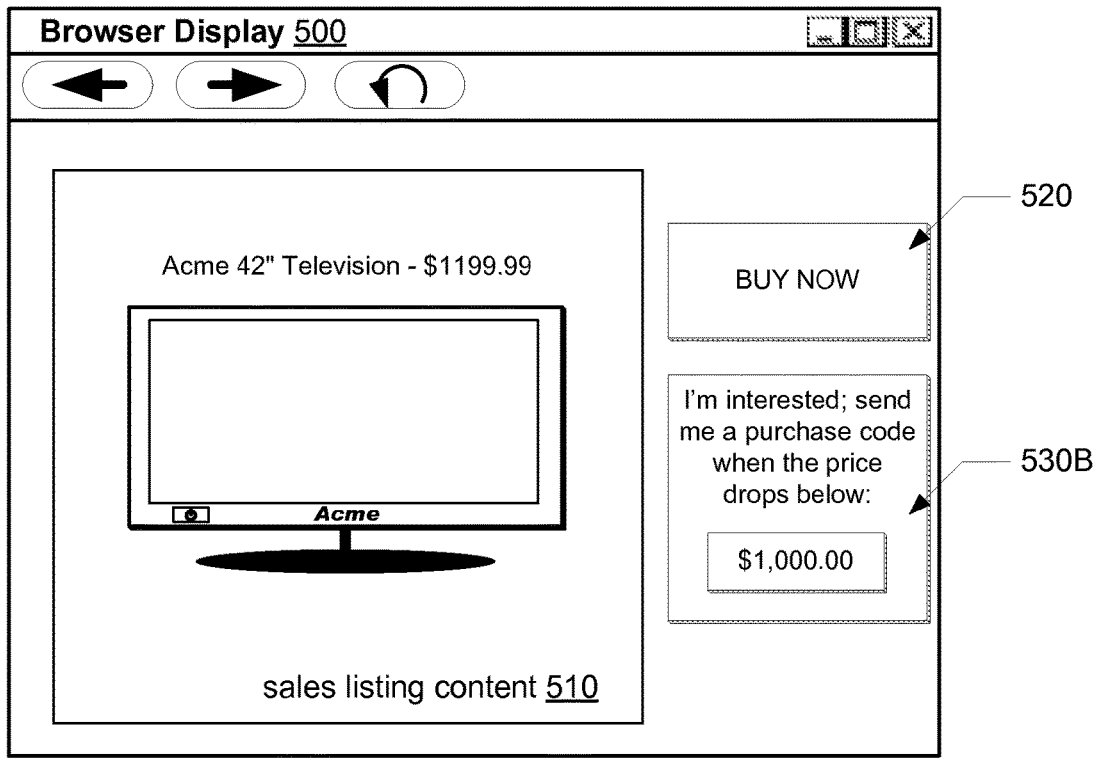
FIG. 5B illustrates another example of a display including a control for selecting an item for sale, according to one embodiment.

Referring momentarily to FIG. 5B, a browser display 500 is illustrated. Browser display 500 includes examples of content and controls that may be provided to users 102 by network-based interface 105. For instance, sales listing content 510 may include information about one or more items for sale such as images, multimedia and/or text based descriptions of the one or more items for sale. As is the case in FIG. 5A, the sales listing content corresponds to a television; however, sales listing content may in other cases correspond to any goods or services. In some cases, a user may choose to purchase the item described by selecting purchase control 520. However, as described above, there may be cases where user 102 is not yet prepared to purchase the item described by the sales listing content. For instance, the user may desire to view, inspect, and/or operate an item of the same type (e.g., same make and model) at a retail store in order to determine if he would like to purchase the item. In some embodiments, the user may be currently unsatisfied with the price of the item and may desire to delay purchase until the item is available at a different (e.g., lower) price. In such cases, the user may indicate that he is interested in the item (but not yet ready to commit to purchasing the item) by selecting selection control 530B. Note that selection control 530B is similar to selection control 530A described above. However, as is the case in the illustrated embodiment, selection control 530B may enable user 102 to specify a price at which he would consider purchasing the item, such as the price threshold described above. The method described herein may include determining the selection of such a selection control as well as the input of a price threshold.

Returning to FIG. 4B, the method may further include, in response to determining that the one or more items are offered for sale at or below a particular price (such as the price threshold described above), sending to a communication device, a message indicating a code corresponding to the selection (block 412). For instance, the method may include message-based purchase service 100 actively monitoring the price(s) of the item(s) indicated by user 102's selection. In other cases, the method may include message based purchase service 100 receiving an indication from another system or entity, such as an e-commerce portal that manages the sales listing for the particular item(s); such indication may indicate the current price of the item(s) or that the price of the item(s) has met a particular threshold (e.g., the threshold described above in regard to block 410).

Figure 6B:
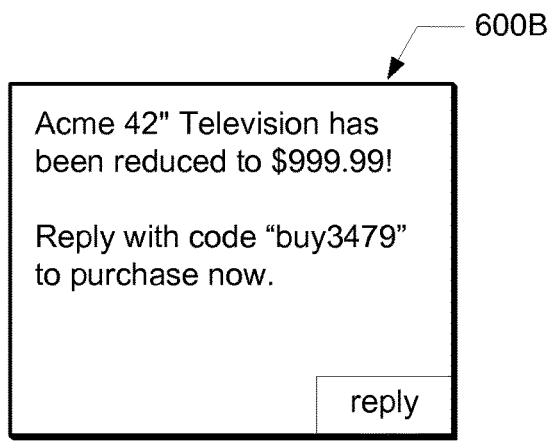
FIG. 6B illustrates another example of a message that may be sent by a message-based purchase service, according to one embodiment.

Once it is determined that the item(s) are offered for sale at or below a particular price, the method may include sending a message indicating a code corresponding to the selection to the communication device in a manner similar to that described above with respect to block 402. One example of such a message is illustrated by message 600B of FIG. 6B. As illustrated, the message includes an indication that the price of the selected item has been reduced to a particular price. The message also includes a code "buy3479" which may be used to purchase such item in a manner similar to the manner described above with respect to FIG. 4A. Note that the code "buy3479 is merely exemplary and that any other type of code could be implemented according to various embodiments. Additionally, the method may include receiving from the communication device through a communication channel that does not include the network-based interface, a message including the code (block 414). The method may also include in response to determining that said received message includes said code, generating a purchase request for said one or more items (block 416). The operation of the method with respect to block 414 and block 416 may be the similar to (or the same as) the operation of the method described above with respect to block 404 and block 406, respectively.

Figure 8:
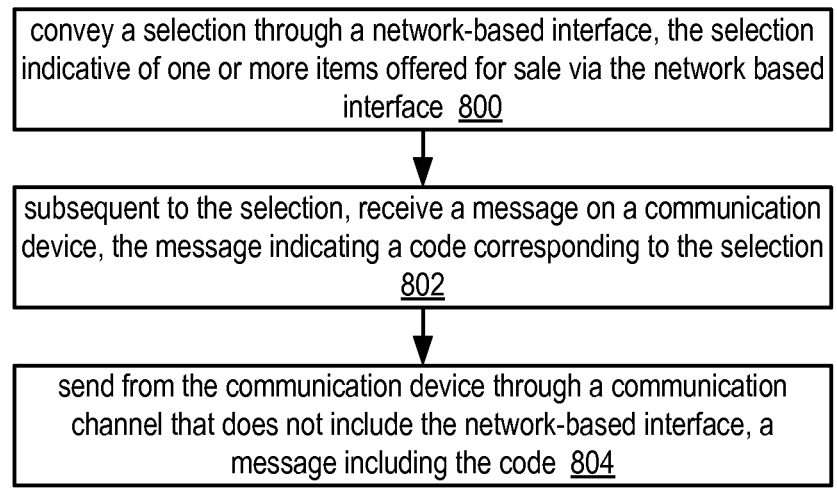
FIG. 8 illustrates a flowchart of an exemplary method that may be implemented by an entity interacting with a message-based purchase service, according to one embodiment.

FIG. 8 illustrates a method performed by an entity (e.g., user 102) utilizing the message-based purchase service described herein. The method begins with the entity conveying a selection through a network-based interface. Such selection may indicate one or more items offered for sale via the network-based interface. For example, as described above, user 102 may select a control of a sales listing to indicate selection of an item. One example of such a sales listing is illustrated above with respect to FIG. 5A. In some embodiments, the user may select an item in cases where cases user 102 is interested in a particular item but not immediately prepared to purchase the item described by the sales listing content. For instance, the user may desire to view, inspect, and/or operate an item of the same type (e.g., same make and model) at a retail store in order to determine if he would like to purchase the item. In various embodiments, such network based interface through which user 102 selects items may be a network-based interface of an e-commerce portal.

Subsequent to the selection, the method may include the entity receiving a message on a communication device; such message may indicate a code corresponding to the selection (block 802). Such code may be generated by message-based purchase service 100 and may include various characters, numbers, and/or symbols. For instance, examples of codes might include "buy," "item ABC123," "1G$3#df95" or some other code. The particular communication device that receives the message may be a communication device previously registered by user 102 with message-based purchase service 100. Examples of such communication devices include a cellular telephone, smart phone, personal digital assistant (PDA) or other device configured to communicate with the message-based purchase service via one or more cellular technologies.

The message received by the entity may enable the user to easily and conveniently purchase a selected item without accessing network-based interface 105. For instance, the code received by the communication device may be provided to message-based purchase service 100 to indicate that the entity desires to purchase the selected items. Since this may be performed from the communication device (which is in many cases a mobile device), the entity need not be bound to a particular location when deciding to purchase items previously selected. For instance, the entity could be located in a retail store and evaluating items that are the same as the selected items. For instance, if the entity had conveyed a selection of a television, the entity could evaluate the television at a retail store. Upon deciding on purchasing the item, the entity may send the code to the message-based purchase service without accessing the network-based interface. Accordingly, the method may include sending from the communication device through a communication channel that does not include the network-based interface, a message including the code. Such message may be sent by the entity via any of the various messages as described above including but not limited to a text message or an email message.

Various embodiments of a system and method for message-based purchasing, as described herein, may be executed on one or more computer systems, which may interact with various other devices. One such computer system is computer system 900 illustrated by FIG. 9. Computer system 900 may be capable of implementing a message-based purchase service, such as message-based purchase service 100. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a message-based purchase service, such as described above, are shown stored within system memory 920 as message-based purchase service 100. In other embodiments, program instructions and/or data may be received, sent or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g. network 995), such as other computer systems (e.g., communication devices 300), or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922 configured to implement message-based purchase service, such as message-based purchase service 100. In one embodiment, message-based purchase service 100 may implement the methods described above, such as the method illustrated by FIGS. 4A-4B. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the actions of the methods may be changed, and various elements may be added, reordered, combined, omitted, modified, etc. Various modifications and changes may be made as would be obvious to a person skilled in the art having the benefit of this disclosure.

These various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A communication device, comprising:
a memory comprising program instructions; and
one or more processors coupled to said memory, wherein the program instructions are executable by at least one of said one or more processors to cause the communication device to:
in response to receiving a message indicating a code from a message-based purchase service, wherein said code indicates a selection of a particular item by a user of a network-based interface for a sales listing of the particular item offered for sale via the network-based interface, wherein said user is associated with a user account that is also associated with said communication device, and in response to receiving input to generate a different message including said code, send through a communication channel that does not include said network-based interface, the different message including said code to the message-based purchase service in order to generate a purchase request for the user to order the particular item.

2. The communication device of claim 1, wherein the program instructions are further executable by the at least one or more processors to cause the communication device to receive via a particular communication channel, an authorization request message for requesting validation information for authorizing the purchase request, wherein the particular communication channel is a communication channel other than the communication channel through which the received message including the code is received.

3. The communication device of claim 2, wherein the program instructions are further executable by the at least one or more processors to cause the communication device to, in response to receiving the authorization request message including the requested validation information, send the requested validation information via the particular communication channel to indicate that the purchase request is authorized.

4. The communication device of claim 1, wherein the received message including said code comprises a text message.

5. The communication device of claim 4, wherein the communication device is configured to receive text messages that adhere to a Short Message Service (SMS) protocol.

6. The communication device of claim 4, wherein said text message is an email message.

7. A method, comprising:
performing, by a communication device:
receiving a message indicating a code from a message-based purchase service, wherein said code indicates a selection of a particular item by a user of a network-based interface for a sales listing of the particular item offered for sale via the network-based interface, wherein said user is associated with a user account that is also associated with said communication device;
receiving input to generate a different message including said code; and
sending through a communication channel that does not include said network-based interface, the different message including said code to the message-based purchase service in order to generate the purchase request for the user to order the particular item.

8. The method of claim 7, further comprising receiving via a particular communication channel, an authorization request message for requesting validation information, wherein the particular communication channel is a communication channel other than the communication channel through which the received message including the code is received.

9. The method of claim 8, wherein said message including the code is sent via a text message communication channel, and wherein said particular communication channel is a voice communication channel.

10. The method of claim 7, wherein the received message including said code comprises a text message.

11. The method of claim 7, further comprising prior to sending the different message including the code, receiving another message indicating a promotional discount for the particular item of the sales listing.

12. The method of claim 7, further comprising prior to sending the different message including the code, receiving a second message indicating the code corresponding to said selection, wherein said second message is received after a given time period has elapsed.

13. The method of claim 7, wherein said message indicating the code is received subsequent to a determination by the message-based purchase service that a location of the communication device is within a given geographical region.

14. A non-transitory, computer-readable storage medium, storing program instructions that when executed by a communication device cause the communication device to implement:
in response to receiving a message indicating a code from a message-based purchase service, wherein said code indicates a selection of a particular item by a user of a network-based interface for a sales listing of the particular item offered for sale via the network-based interface, wherein said user is associated with a user account that is also associated with said communication device, and in response to receiving input to generate a different message including said code, sending through a communication channel that does not include said network-based interface, the different message including said code to the message-based purchase service in order to generate a purchase request for the user to order the particular item.

15. The non-transitory, computer-readable storage medium of claim 14, wherein the program instructions further cause the communication device to implement receiving via a particular communication channel, an authorization request message for requesting validation information, wherein the particular communication channel is a communication channel other than the communication channel through which the received message including the code is received.

16. The non-transitory, computer-readable storage medium of claim 15, wherein said different message including the code is sent via a text message communication channel, and wherein said particular communication channel is a voice communication channel.

17. The non-transitory, computer-readable storage medium of claim 15, wherein the program instructions further cause the communication device to implement in response to receiving the authorization request message including the requested validation information, sending the requested validation information via the particular communication channel to indicate that the purchase request is authorized.

18. The non-transitory, computer-readable storage medium of claim 14, wherein the program instructions cause the communication device to further implement prior to sending the different message including the code, receiving another message indicating a promotional discount for the particular item of the sales listing.

19. The non-transitory, computer-readable storage medium of claim 14, wherein the program instructions cause the communication device to further implement prior to sending the message including the code, receiving a second message indicating the code corresponding to said selection, wherein said second message is received after a given time period has elapsed.

20. The non-transitory, computer-readable storage medium of claim 14, wherein said message indicating the code is received subsequent to a determination by the message-based purchase service that a location of the communication device is within a given geographical region.

* * * * *